United States Patent Office 2,942,841
Patented June 28, 1960

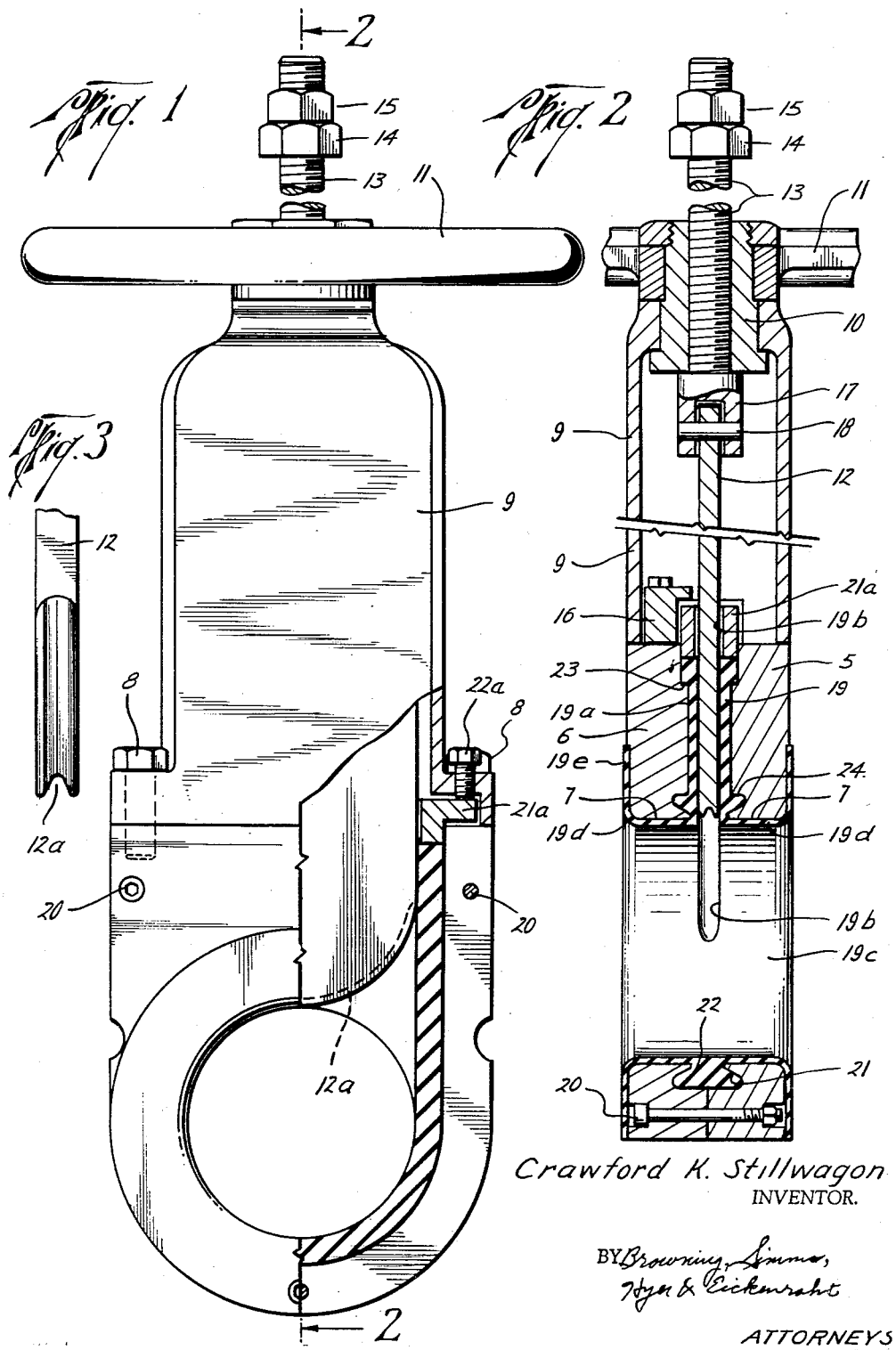

2,942,841
SLIDE VALVE

Crawford K. Stillwagon, 5325 Kirby Drive, Houston 5, Tex.

Filed Dec. 13, 1957, Ser. No. 702,622

6 Claims. (Cl. 251—214)

This invention relates to improvements in valves and refers more particularly to slide valves and the resilient seal or seat assemblies for such valves.

It is desirable in handling fluids which are corrosive or for other reasons should not be in contact with metal parts of the valves, to utilize seat members which will shield the metal portions of the valves from contact with the fluids. Particularly in handling liquid TNT it is desirable to have no crevices in which the material can remain which might be subjected to impact or sparking that could cause an explosion.

In prior attempts to solve this problem, it has been necessary to provide metal bearing or wear plates for controlling movement of the slide valve member between opened and closed positions. Such contact between metal parts is, of course, a hazard in the handling of explosives and requires special alloys in the event the fluids are corrosive.

An object of this invention is to provide a slide valve in which there are no metal-to-metal moving parts within the sealed chamber of the valve.

A further object is to provide a valve in which the fluids within the conduit do not have contact with metal parts other than the valve member itself.

Another object is to provide a valve which is relatively inexpensive to manufacture and assemble, is simple and rugged in design, and is suitable for use in handling fluid pressures up to 300 p.s.i. and even higher.

Another object is to provide in a slide valve a seal element formed of resilient, yieldable seal material which provides the sole bearing for the valve member during its reciprocal movement in opening and closing the valve.

Another object is to provide in a slide valve a means between the valve member and the resilient seat for it, to help support the valve member against pressure differentials with the valve closed, which also enhances the seal characteristics of the valve, and which reduces the unit load between the seated valve member and seat thereby reducing the likelihood of cutting of the seat member.

Other objects and advantages of the invention will appear from the description, the drawings, and the claims.

In the drawings, which form a part of the instant specification and are to be read in conjunction therewith, and in which like reference numerals are used to indicate like parts in the various views:

Fig. 1 is an elevational view showing one inline face of a valve constituting one illustrative embodiment of the present invention;

Fig. 2 is a sectional view taken on the line 2—2 in Fig. 1 in the direction of the arrows; and Fig. 3 is an enlarged view of the sealing end of the slide valve member of the valve shown in Figs. 1 and 2, illustrating the grooved shape of the sealing edge thereof.

In the drawings, the valve comprises a body made up in the preferred embodiment of two parts 5 and 6. The body is formed with an opening which provides a flow-passageway illustrated at 7. To the upper end of the body is secured by corner bolts 8 a bonnet housing or casing 9. This casing preferably is closed so as to be dust proof and serves as a yoke for mounting the valve stem nut 10 for rotary movement. The nut 10 has a rotary drive connection with the handwheel 11.

In order to control flow through the passageway 7, the valve is provided with a slide valve member 12 having an actuating connection through the stem 13 with the handwheel 11. The stem 13, of course, is threaded and is engaged with the nut 10 so that reciprocation of the stem results from turning the handwheel 11. A nut 14 and lock nut 15 may be positioned upon the upper end of the stem to limit downward travel or this may be accomplished by use of a positive stop shown at 16 bolted to one end of the body. Usually only one such stop means will be used. The lock nuts have the advantage of being adjustable to accommodate wear of the seat member.

The connection between the slide valve member 12 and the stem, preferably, has a loose fit to allow the blade 12 to move laterally somewhat under the influence of a pressure differential in the valve. A suitable connection is provided by a loose fitting yoke or fork 17 pinned at 18 to the blade 12. The opening in the blade 12, through which the pin 18 passes, should be sufficiently large to provide some clearance and prevent a binding of the blade on the pin. Also, the space between the arms of the fork 17 should be greater than the width of the blade 12 at its connection, so that the blade will not bind in the connection, but nevertheless its upward and downward movement is positively controlled by the connection.

The purpose for providing the loose fit between the yoke 17 and the blade 12 is to insure that the lateral position of the blade is governed only by the resilient seal member or seat member 19. It is by this expedient that the sole bearing for supporting the blade or slide valve member 12 is provided by the resilient seat member.

In order to house the seat member 19, the body is formed with a chamber which intersects the flow-passageway through the body. Preferably, the two-piece body is used, as this facilitates greatly the assembly of the seat in position within the body. Where the body is two pieces, half of the chamber is formed by a suitable recess in each of the confronting faces of the two body parts. By this expedient, the body parts 5 and 6 may each be formed identically. A suitable fastening means in the form of three Allen head bolts 20 are provided for securing the body parts together.

The chamber within the body parts has an upper extension, which is substantially rectangular in cross section, and which joins a ring-shaped portion 21 surrounding the passageway 7. Preferably, the ring-shaped portion 21 is formed with retaining ribs such as a dovetail shape for the purpose of securing the ring-shaped portion of the seat member 19 in position surrounding the flow-passageway or flow opening. This ring-shaped portion of seat member 19 is illustrated in the drawings at 22. The ring-shaped portion 22 of the seat member preferably is integral with the extension 19a, which is rectangular in cross section.

The portion 19a of the seat member fills the extension portion of the chamber in the valve body and the slide valve member 12 fits a slideway 19b, formed therein. The fit of the slide member in the slideway is snug so that the walls of the slideway of the seat member provide both a sealing engagement with the slide valve member and also a bearing support for it. In its elevated position, as shown in the drawings, the slide valve member is pulled completely into the extension portion of the seat member, but by turning the hand-wheel, the slide valve member can be forced to a closed position closing the opening 19c formed in the seat member. In this latter position, the lower or sealing edge of the slide valve member is forced into sealing engagement with the ring portion of the seat member. While the lower edge of the slide valve member may be arcuate or even flat, it has been found preferably to groove the lower edge as illustrated in Fig. 3. The groove preferably is a V-shaped groove 12a and extends over the arcuate or engaging end of the blade 12.

The grooved lower end of the slide valve member serves several purposes. It increases the bearing area between the resilient seat member and the blade thereby reducing the likelihood of the seat member being cut by the blade being forced against it. Also, the material of the seat member flows into the grooved portion and this provides a support for the lower end of the blade against lateral movement due to the influence of the pressure differential across the blade. Thirdly, if the groove is V-shaped, the resilient material within the groove is placed under greater pressure due to the wedge action of the V-shaped walls. This enhances the seal at the edge of the valve blade.

In the preferred embodiment shown in the drawings, the seat member 19 has end portions 19d which completely cover the metal portion of the flow-passageway 7. The end portions 19d also are integrally connected with flanges 19e. The flange portions 19e provide a seal with the flange fittings of the pipeline by which the valve is mounted in the line. The portions 19e and 19d thus serve to completely isolate the valve body parts from the fluid of the conduit. This is, of course, important where corrosive fluids are handled, inasmuch as it makes it possible to fabricate the body parts from ordinary mild steel or steel castings without the use of expensive non-corrosive alloys.

Also, due to the snug fit of the blade within the slideway of the seat member, there is no recess for the retention of fluids and this is particularly of advantage in handling explosive fluids.

To insure a seal between the blade and the seat member at the upper end of the seat member where the blade extends therefrom, a gland member 21a is secured in place by suitable bolts 22a. This places the end portion of the seat member under compression and this compression extends in a diminishing degree completely over the contact of the slideway with the valve blade.

To provide an additional anchor for retention of the extended portion of the seat member to overcome drag imposed on it as the valve blade is reciprocated, the body parts are preferably provided with means for resisting endwise movement of the seat member. This means may include oppositely facing shoulders 23 and 24 formed on the body parts within the chamber. These shoulders face the extension of the blade and the flow-passageway, respectively. It is to be noted that with this arrangement, when the blade is moved there is a tendency to anchor the seat member at the end so that any drag of the member on the blade tends to stretch the member and thus slightly reduce the frictional engagement of the seat member with the blade. Thus, the seat member may be sufficiently tight against the blade so that the sole support for the blade within the body is provided by the resilient, yieldable material of the seat member. In this respect it is to be noted that the gland 21 with the slideway formed therein actually provides a freedom of movement of the blade laterally to prevent any binding action between the blade and the gland.

It will be seen that there has been provided a valve that is very simple in construction and that lends itself to economic fabrication. The body parts being identical, only a single inventory need be kept for the two body parts. The arrangement is such that the body parts may be completely shielded from the fluid of the conduit controlled so that corrosive fluids may be handled without utilizing expensive non-corrosive alloys. The construction is such that the seat member, which is an expendable part, may be easily replaced and the slide valve and seat member may be sold as assemblies because the valve member will be subject to wear due to high velocities of fluid about its seating edge as the valve member is moved into engagement with the seat or just cracked from the seat.

The assembly is such that the valve member has a floating mounting or bearing in the resilient seat element and does not come into contact with any metal part within the sealed chamber of the valve. Thus, there can be no metal-to-metal impact or sparking to set off explosive materials within the valve. The design is such that the valve outwardly operates in the fashion of any rising stem gate valve so that workmen will be familiar with its operation and a mere visual inspection discloses whether the valve is in open or closed position. The seal of the valve member against the seat member, with the valve in closed position, is provided partially by external energization or mechanical pressure due to the action of the stem within the nut and in part due to the pressure forcing the blade against the seat member about its engagement. The only limit to the pressures that may be handled by the valve is that the pressure energization due to the pressure acting against the surface of the blade that is covered provides in effect a multiple area seal, which, as very high pressures are encountered, will cause a deleterious flow of the material of the seat member. However, due to the fact that there are broad bearing areas between the valve member and the seat member and due to the support given the lower end of the blade by the grooved engagement between the blade and the resilient seal element, unexpectedly high pressures in the order of 300 p.s.i. and even higher may be controlled with this valve. The valve, of course, is not a high pressure valve for use in handling extreme pressures.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A slide valve comprising, a body with a flow-passageway therethrough and a chamber formed therein extending transversely of the flow-passageway, a web of resilient yieldable sealing material filling the chamber, said web having a ring portion providing a flow opening through the web and coaxial with the flow-passageway, said web having a slideway formed therein, a slide valve member within the slideway mounted for reciprocation therein between a closed position blocking the flow opening and a position withdrawn from the flow opening, said slide valve member in all positions extending from the web, and compression means placing the portion of the web adjacent the extension of the slide valve member under compression to seal the slideway and the body chamber from the exterior of the valve, the web of material providing the sole bearing for the slide valve member.

2. The valve of claim 1 wherein the end of the slide valve member within the slideway has a groove formed therein for engaging the inner surface of the ring to seal thereagainst and help support the end of the blade against movement under pressure differential and to increase the bearing area of the engagement.

3. The valve of claim 1 wherein the end of the slide valve member within the slideway has a V-shaped groove formed therein for engaging the inner surface of the ring to seal thereagainst and help support the end of the blade against movement under pressure differential and to increase the bearing area of the engagement.

4. The valve of claim 1 wherein the ring of the web of material covers the entire inner surface of the body passageway.

5. The valve of claim 1 wherein the body is formed of two parts with the chamber formed therebetween and means are provided for securing the parts in assembled relation with the web of material and slide valve member in place.

6. A slide valve comprising, a body with a flow-passageway therethrough and a chamber formed therein extending transversely of the flow-passageway, a web of resilient yieldable sealing material filling the chamber, said web having a ring portion providing a flow opening through the web and coaxial with the flow-passageway, said web having a slideway formed therein, a slide valve member within the slideway mounted for reciprocation therein between a closed position blocking the flow opening and a position withdrawn from the flow opening, said slide valve member in all positions extending from the web, said body having means providing oppositely facing shoulders adjacent and facing the extended end of the slide valve member and the passageway, said shoulders engaging the web of material to secure it against movement as the slide valve member is reciprocated, and compression means placing the portion of the web adjacent the extension of the slide valve member under compression to seal the slideway and the body chamber from the exterior of the valve, the web of material providing the sole bearing for the slide valve member.

References Cited in the file of this patent

UNITED STATES PATENTS

| | | |
|---|---|---|
| 72,340 | Turner | Dec. 17, 1867 |
| 776,900 | Forse | Dec. 6, 1904 |
| 1,106,933 | Farley | Aug. 11, 1914 |
| 1,779,503 | Swindin | Oct. 28, 1930 |
| 2,329,315 | Allen | Sept. 14, 1943 |
| 2,669,416 | Hilton | Feb. 16, 1954 |
| 2,731,231 | Garrott | Jan. 17, 1956 |
| 2,732,170 | Shand | Jan. 24, 1956 |
| 2,774,371 | Grannenfelt | Dec. 18, 1956 |
| 2,829,862 | Wey | Apr. 8, 1958 |

FOREIGN PATENTS

| | | |
|---|---|---|
| 8,986 | Great Britain | of 1884 |
| 693,257 | Great Britain | of 1953 |